United States Patent [19]

Kolonko et al.

[11] Patent Number: 4,775,432

[45] Date of Patent: Oct. 4, 1988

[54] HIGH MOLECULAR WEIGHT POLYCAPROLACTONE PREPOLYMERS USED IN HIGH-ENERGY FORMULATIONS

[75] Inventors: Kenneth J. Kolonko, Brigham City, Utah; Michael W. Barnes, Warrenton, Va.; Lydia L. Biegert, Brigham City, Utah

[73] Assignee: Morton Thiokol, Inc., Chicago, Ill.

[21] Appl. No.: 927,887

[22] Filed: Nov. 6, 1986

[51] Int. Cl.[4] .............................................. C06B 45/10
[52] U.S. Cl. ..................................... 149/19.4; 149/20
[58] Field of Search .................................. 149/19.4, 20

[56] References Cited

U.S. PATENT DOCUMENTS

| | | | |
|---|---|---|---|
| 4,394,329 | 7/1983 | Barnes | 149/19.4 |
| 4,430,131 | 2/1984 | Tremblay | 149/19.4 |
| 4,536,235 | 8/1985 | Lelu et al. | 149/19.4 |
| 4,555,277 | 11/1985 | Scribner | 149/19.4 |

OTHER PUBLICATIONS

Schindler, A., et al., *J. of Polymer Science* 20 (1982) pp. 319–326.

*Primary Examiner*—Edward A. Miller
*Attorney, Agent, or Firm*—Wayne E. Nacker; Gerald K. White

[57] ABSTRACT

Poly(caprolactone) polymers are provided having molecular weights of 4000 or higher, are used to form propellant binders. When the high molecular weight poly(caprolactone) polymers are used in propellant formulations and cured with isocyanates of adequate functionality, propellants are produced having improved stress and strain characteristics relative to presently formulated propellants having binders of cured, lower molecular weight poly(caprolactone) polymers.

12 Claims, No Drawings

HIGH MOLECULAR WEIGHT POLYCAPROLACTONE PREPOLYMERS USED IN HIGH-ENERGY FORMULATIONS

The present invention relates to improved high-energy compositions in which the binder is an isocyanate-cured poly(caprolactone).

BACKGROUND OF THE INVENTION

Solid, high-energy compositions, such as propellants for rocket motors, gasifier charges, explosive charges or the like, generally comprise particulate solids, including fuel material and oxidizers, dispersed in an elastomeric binder which spatially immobilizes the solids. The high-energy composition frequently contains nitrate ester plasticizers which enhance the elastomeric properties of the binder and furthermore enhance the energy value of the high-energy composition.

Among the common types of propellant binders are poly(caprolactone)-based binders in which poly(caprolactone) polymers are cured with poly(isocyanates). Poly(caprolactone) polymers exhibit excellent miscibility with nitrate ester plasticizers and are therefore especially suitable for propellant formulations which include nitrate ester plasticizers. Poly(caprolactone) binders have thermal and mechanical properties suitable for a wide variety of propellant applications.

Poly(caprolactone) polymers (PCP) presently used to prepare binders in propellant formulations generally have molecular weights in the 2000 to 3000 range and generally have functionalities of 2. Curatives are poly(isocyanate) compounds of multiple functionality.

Advanced rocket motor designs continue to demand additional mechanical property performance from propellant binder systems. Such mechanical performance requirements are not achieved by presently used poly(caprolactone) binders. Thus, there exists a need for novel poly(caprolactone) binders having improved mechanical properties, particularly improved stress and strain capabilities.

SUMMARY OF THE PRESENT INVENTION

In accordance with the present invention, binders for high-energy compositions, e.g., solid propellants, are prepared from poly(caprolactone) polymers having molecular weights substantially higher than the PCP's currently used in producing propellant binders. It is found that binders produced from the higher molecular weight polymers provide the cured propellants with increased stress and strain capability and also lower propellant moduli. PCP's in accordance with the invention have molecular weights ranging from about 4000 to about 20,000 and preferably from about 6000 to about 10,000. PCP's used to form binders in accordance with the invention are provided having functionalities ranging from about 1 to about 6 and preferably have functionalities ranging from about 2 to about 4.

DETAILED DESCRIPTION OF CERTAIN PREFERRED EMBODIMENTS

While advantages of PCP binders in propellant systems are well recognized, particularly good compatibility with nitrate esters, certain mechanical limitations of PCP binders are also recognized. In order to tailor PCP properties to particular propellant applications, novel PCP-based binders are provided herein having improved mechanical properties, particularly higher stress and strain capability, mechanical properties which are generally desirable for propellants. Furthermore, the binders provide for lower propellant moduli, a generally desirable property of propellants. Improved mechanical characteristics of propellants are achieved by providing poly(caprolactone) polymers having substantially higher molecular weights than PCP's previously considered suitable for forming propellant binders, i.e., molecular weights between about 4000 and about 20,000 and preferably between about 6000 and about 10,000, as opposed to molecular weights of 2000 to 3000 heretofore used. (Herein, unless otherwise stated, molecular weights are used to refer to number average molecular weights. Polydispersities of PCP's in accordance with the present invention generally range from about 1.05 to about 1.5) The high molecular weight poly(caprolactone) polymers are cured with poly(isocyanate) compounds to form elastomeric binders of solid propellant compositions.

The combination of improved mechanical characteristics of the binders formed from higher molecular weight PCP's would not have been predicted in advance. Inherently, cured binders formed from PCP's of higher molecular weights (longer chains) have lower cross-linking densities than binders formed from lower molecular weight PCP's. Increased cross-linking in cured PCP elastomers tends to increase stress-capability, but decrease strain-capability. Thus, it is surprising that binders formed from higher molecular weight PCP's having inherently lower cross-linking densities exhibit both increased stress-capability and increased strain-capability, It is not known why this should be the case, and the inventors are not bound to any theory; however, it is surmised that the combination of increased stress-capability and increased strain-capability arises from the internal crystal structure of the regions of the poly(caprolactone) chains intermediate the sites of isocyanate curing.

Good low-temperature mechanical properties are considered to be important for propellants because they may be exposed to very low temperatures during use, e.g., in missiles carried on the wing of an airplane. These higher molecular weight poly(caprolactone) polymers retain the good low temperature properties observed for lower (2000–3000) molecular weight polymers.

Long-chain poly(caprolactone) polymers used to form binders in accordance with the present invention are generally produced by polymerization of caprolactone monomers using an initiator with one or more hydroxyl groups in the presence of a catalyst. The initiator is generally a low molecular weight compound, e.g., M.W. below about 200, having one or more and preferably at least two hydroxyl groups. Generally, chain elongation proceeds from each of the hydroxyl groups, resulting in a poly(caprolactone) having a functionality that is generally equal to the number of the hydroxyl groups of the initiator. Thus a diol initiator will give rise to a PCP having a functionality of about 2; a triol, a functionality of about 3, etc. Some suitable hydroxyl group-containing initiators include, but are not limited to: diethyleneglycol, trimethylol propane, pentaerythrytol, ribitol and sorbitol. The catalyst facilitates the reaction, presumably by first complexing with either the caprolactone monomer or the hydroxyl-containing initiator to form an active species. The presently preferred catalyst is stannous octoate. Other suitable catalysts include, but are not limited to metal alkoxides, metal amides, acetyl perchlorate and metal alkyls.

Polymerization continues until the supply of available monomers is substantially depleted, e.g., at least about 99% depleted. Accordingly, the chain length is a function of the molar ratio of caprolactone monomer to initiator present; that is, the average number of caprolactone monomer units incorporated into each PCP molecule is generally the number of poly(caprolactone) monomer units available divided by the number of initiator molecules. Because chain elongation proceeds from each hydroxyl group, the average number of mer units of each chain, as measured from the initiator molecule, is further divided by the number of available hydroxyl groups on the initiator. To formulate the high molecular weight PCP's according to the present invention, a substantially lower proportion of initiator is used relative to caprolactone monomers than are used to form lower molecular weight PCP's.

Polymerization of caprolactone is preferably conducted at temperatures of between about 80° C. and about 120° C. in order to achieve relatively rapid polymerization. Preferably, polymerization is conducted in an inert atmosphere, e.g., under nitrogen or argon.

High molecular weight PCP's are curable in a conventional manner with isocyanates of sufficient functionality. To ensure adequate curing, the PCP should have an average functionality of at least about 2. PCP's having average functionalities of about 2 are cured in a conventional manner with poly(isocyanate) which both extend the polymer chains and cross-link the same, and a poly(isocyanate) preparation having a functionality of at least about 3.5 is generally required to obtain sufficient cross-linking. A typical polyisocyanate preparation useful for curing PCP having a functionality of about 2 is sold under the tradename Desmodur N-100. This preparation is a mixture of isocyanates and has a functionality of between 3 and 4.

PCP polymers having higher functionality may be cured with isocyanates of proportionally lower functionality. PCP prepolymers having functionality of about 3.5 or greater may be adequately cured with a homogeneous diisocyanate, such as isophorone diisocyanate (IPDI) or tolylene diisocyanate (TDI). An advantage to being able to cure with a homogeneous diisocyanate is that the properties of a homogeneous diisocyanante curative are fully predictable, whereas properties of a mixed-species poly(isocyanate) preparation curative may vary as the complicated poly(isocyanate) mixture changes with age or manufacture. Mixed-species isocyanate preparations may vary in chemical properties from batch-to-batch and even over time, and some problems have been encountered when using commercially available mixed-species poly(isocyanate) preparations.

While the PCP polymers according to the present invention generally and preferably have functionalities ranging from about 2 to about 4, PCP prepolymers of the present invention may have functionalities ranging from as low as about 1 to as high as about 6. PCP prepolymers with functionalities significantly below 2 cannot be used alone to form propellant binders, but may be admixed as diluents with PCP prepolymers of higher functionality to control the cross-linking density. PCP prepolymers having functionalities significantly above 4 may be used where a higher cross-linking density is used to tailor the properties of the binder.

In preparing propellants or other high-energy compositions, it is preferred that the ratio of isocyanate moieties (NCO) of the curative to hydroxy moieties (OH) of the PCP be at least about 1.3. More than one equivalent of isocyanate moieties is generally required because isocyanate moieties may react with species of propellant formulations other than the hydroxyl moieties of the PCP. Typically the isocyanate curative comprises between about 0.5 and about 1.5 wt % of the cured propellant. To enhance the cross-linking density, the isocyanate may be supplemented with cross-linking agents, such as cellulose acetate butyrate (CAB).

Once the isocyanate is added to the prepolymer, curing will commence. Thus, when preparing high-energy compositions, it may be desirable to add the isocyanate curative last, e.g., after the other components have been thoroughly mixed. Curing takes place most rapidly at a temperature range of between about 120° and about 140° F. Mixing and casting may be done at a lower temperature, and the temperature raised to an optimal curing temperature after casting. A minor amount of a cure catalyst, such as triphenyl bismuth (TPB) may also be included in the formulation to promote rapid curing.

To form propellants in accordance with the invention, the polymers are premixed with other ingredients of the propellant formulation, including particulate fuel material solids, particulate oxidizer solids and liquid nitrate ester plasticizers. Then the curative is added to the formulation and the propellant is cast and cured. The propellant formulation may also include other substances as in known in the art, such as stabilizers, lubricants and bonding agents.

Propellant formulations in accordance with the present invention generally include between about 70 and about 85 weight percent particulate solids, including both fuel material, such as particulate aluminum, and oxidizers, such as ammonium perchlorate (AP), cyclotetramethylene tetranitramine (HMX), and cyclotrimethylene trinitramine (RDX). The balance is substantially all binder or plasticized binder (PCP polymer plus isocyanate curative). When nitrate ester plasticizers are included in the propellant formulation, the weight ratio of plasticizer to binder is generally at least about 2.0:1 and preferably at least about 2.5:1.

The invention will now be described in greater detail by way of specific examples.

EXAMPLE 1

Preparation of PCP(DEG)6000.

A quantity of dried and distilled diethylene glycol (DEG) (174 g, 1.65 moles), stannous octoate (stannous 2-ethylhexanoate, 10 g, 0.0247 moles), and dried and distilled caprolactone (10 Kg, 87.72 moles) were placed in a 12 liter reaction vessel with a removable three-neck top and equipped with a mechanical stirrer, heating mantle, thermometer and thermowatch, drying tube, and dry argon inlet. A gentle argon sweep was applied and the reaction mixture allowed to heat to 115° C. This temperature rise occurred over a 3-hour period. The reaction temperature was maintained between 110° and 115° C. for 19 hours. In general, these type of caprolactone polymerization reactions are 100% complete after 18 hours and can be monitored by measuring caprolactone level. The polymer was poured into pyrex dishes, allowed to cool to form a waxy solid, and gave a melting point of 56°–58° C. Gel permeation chromatography (poly(glycoladipate) standard) gave a molecular weight (Number Average) of 6550 gm/mole with a polydispersity of 1.21. Hydroxyl determination showed an equivalent weight of 3106 gm/eq, indicating a functionality of 2.1.

EXAMPLE 2

Preparation of PCP(PER)10,000

A quantity of dried and distilled pentaerythritol (PER) (59.6 g, 0.4382 moles), stannous octoate (stannous 2-ethylhexanoate, 4.0 g, 0.0099 moles), and dried and distilled caprolactone (4 Kg, 35.09 moles) were placed in a 5 liter reaction vessel with a removable three-neck top and equipped with a mechanical stirrer, heating mantle, thermometer and thermowatch, drying tube, and dry argon inlet. A gentle argon sweep was applied, and the reaction mixture allowed to heat to 110° C. The reaction temperature was maintained between 110° and 115° C. for 19 hours. The polymer was poured into pyrex dishes, allowed to cool to give a waxy solid. Gel permeation chromatography (poly(glycoladipate) standard) gave a molecular weight (Number Average) of 10,545 gm/mole with a polydispersity of 1.12. Hydroxyl determination showed an equivalent weight of 2347 gm/eq, indicating a functionality of 4.5.

Properties of the PCP(PER)10,000 and PCP(DEG)6000 (Example 1) are given in Table I below.

TABLE I

| Property | Properties for Poly(Caprolactone) Polymer | |
|---|---|---|
|  | PCP(DEG)6000 | PCP(PER)10,000 |
| mpt (uncorrected) | 56–58° C. | 52–54° C. |
| $M_n$ (gm/mole) | 6485 | 9420 |
| $M_n/M_w$ | 1.22 | 1.10 |
| Acid Equivalents (eq/100 g) | 0.0020 | 0.0018 |
| Hydroxyl Eq. Wt. (gm/eq) | 3106 | 2273 |
| Functionality | 2.09 | 4.14 |

EXAMPLE 3

Propellant Formulation

A propellant containing cyclotetramethylene tetranitramine (HMX) and a propellant containing cyclotrimethylene trinitramine (RDX) were formulated according to Table II below:

TABLE II

| | Propellant Formulations | | |
|---|---|---|---|
| | Percent | | |
| Ingredient | HMX Propellant | RDX Propellant | Function |
| PCP(DEG)6000 | 8.190 | 6.888 | Prepolymer |
| BTTN | 13.358 | 12.920 | Plasticizer |
| TMETN | 4.453 | 4.31 | Plasticizer |
| MNA | 0.25 | 0.25 | Stabilizer |
| Al (60μ) | 17 | 17 | Fuel |
| HMX (20μ) | 30 | — | Oxidizer |
| HMX (3.2μ) | 16 | — | Oxidizer |
| RDX (13μ) | — | 36.51 | Oxidizer |
| RDX (3.2μ) | — | 13.49 | Oxidizer |
| AP (200μ) | 10.00 | 8.00 | Oxidizer |
| Des N-100 | 0.715 | 0.602 | Curative |
| TPB | 0.01 | 0.01 | Cure Catalyst |
| CAB | 0.025 | 0.025 | Crosslinker |

BTTN = butanetriol trinitrate, TMETN = trimethylol ethane trinitrate MNA = (N—methyl-2-nitro) aniline, Al = particulate aluminum, AP = ammonium perchlorate, TPB = triphenylbismuth and CAB = cellulose acetate butyrate.

These formulations were prepared by the following procedure:

The required quantity of binder components, including poly(caprolactone) polymer, BTTN and TMETN nitrate ester plasticizers, MNA, and aluminum were added to a warm (130° F.) mix bowl and stirred for 5 minutes. The mix bowl was lowered, and the material remaining on the mix blades and at the top portion of the mix bowl was removed with a Teflon ® spatula and placed in the bottom of the mix bowl. This process will be referred to as a scrape-down procedure in the subsequent discussion. One half of the HMX and all of the AP was added to the mix bowl and the contents mixed for 15 minutes. The mix bowl was lowered, the mix blades and bowl scraped down, and the remaining HMX added to the mix bowl. The contents were mixed for 10 minutes, the mix bowl lowered, and the scrape-down procedure conducted. The contents were mixed for 20 minutes, removed from the mix bowl, and stored at 130° F. for 3 to 5 days. This material is designated as the propellant prebatch.

The required amount of prebatched propellant was added to the warm (130° F.) mix bowl and mixed under vacuum for 90 minutes. Des N100 and TPB were added and warm; vacuum mixing continued for 30 minutes. The propellant was cast into a 1×4×4 inch carton and cured at 130° F. for 6 days.

The aluminized, ammonium perchlorate-(HMX or RDX) oxidized high-energy nitrato plasticized propellant formulations represent typical reduced smoke propellants designed for tactical motor use.

Class C JANNAF dogbone specimens were cut and stamped from this cured sample for mechanical property testing. The mechanical properties of the propellants are given in Table III below where they are compared to corresponding propellants formed from PCP0260, a PCP having a molecular weight of about 3000.

TABLE III

| | Tactical Propellant Properties | | | |
|---|---|---|---|---|
| | HMX Propellants | | RDX Propellants | |
| Property | PCP0260 | PCP (DEG)6000 | PCP0260 | PCP (DEG)6000 |
| $E^{2.7\ psi}$ (77°) | 994 | 467 | 388 | 195 |
| $\sigma_m$ (77°) | 108 | 231 | 55 | 89 |
| $\epsilon_m/\epsilon_f\%$ (77°) | 276/276 | 474/474 | 237/234 | 532/532 |
| $\epsilon_m^c\%$ (77°) | 276 | 474 | 243 | 532 |
| $\epsilon_m/\epsilon_f\%$ (−65°) | 24/58 | 54/77 | 9/213 | 10/220 |

It can be seen that the mechanical properties of these propellants are exceptionally good for these classes of propellants. These results far exceed those obtained using the lower molecular weight PCP. In particular, ambient stress capabilities were found to be several times greater than those obtained from the lower molecular weight PCP. Moduli of propellants using high molecular weight PCP's are about half those of propellants using lower molecular weight PCP's.

EXAMPLE 4

The tetrafunctional polymer, PCP(PER)10,000 (Example 2), was employed to formulate an aluminized, ammonium perchlorate-HMX oxidized high energy nitrato plasticized propellant (Table IV below). This polymer system was found to be curable with difunctional isocyanate curatives (IPDI (A) or TDI(B)). The mechanical properties for these formulations are shown in Table V below. These formulations offer an alternative to the conventional method for preparing a propellant binder system (i.e., use of a difunctional PCP polymer and a polyfunctional isocyanate curative).

TABLE IV

| Ingredient | Propellant Formulations A | B | Function |
|---|---|---|---|
| PCP(PER)10,000 | 6.311 | 6.408 | Polymer |
| BTTN | 12.70 | 12.70 | Plasticizer |
| TMETN | 4.23 | 4.23 | Plasticizer |
| MNA | 0.25 | 0.25 | Stabilizer |
| Al (60μ) | 19.00 | 19.00 | Fuel |
| HMX (20μ) | 31.40 | 31.40 | Oxidizer |
| HMX (3.2μ) | 11.60 | 11.60 | Oxidizer |
| AP (200μ) | 7.00 | 7.00 | Oxidizer |
| AP (5μ) | 7.00 | 7.00 | Oxidizer |
| IPDI | 0.465 | — | Curative |
| TDI | — | 0.368 | Curative |
| TPB | 0.01 | 0.01 | Cure Catalyst |
| CAB | 0.025 | 0.025 | Crosslinker |

TABLE V

| | Propellant Properties | |
|---|---|---|
| | Formulation | |
| Property | A | B |
| $E^{2.7}$ psi (77°) | 310 | 322 |
| $\sigma_m/\sigma_m$ psi (77°) | 68/396 | 88/496 |
| $\epsilon_m/\epsilon_f\%$ (77°) | 479/481 | 468/468 |
| $\epsilon_m{}^c\%$ (77°) | 497 | 468 |
| $\epsilon_m/\epsilon_f\%$ (−65°) | 14/71 | 17/54 |
| EOMV kp | 11.2 | 14.4 |
| NCO/OH | 1.5 | 1.5 |
| Curative | IPDI | TDI |

While the invention has been described in terms of certain preferred embodiments, modification obvious to one with ordinary skill in the art may be made without departing from the scope of the present invention. For example, although the invention has been described primarily in terms of propellant formulations, the elastomeric binders formed from high molecular weight poly(caprolactone) polymers are similarly useful in other high-energy compositions, such as explosives and gasifiers.

Various features of the invention are set forth in the following claims.

What is caimed:

1. A solid propellant composition comprising between about 70 and about 85 weight percent particulate material including particulate fuel material and particulate oxidizer material, balance consisting essentially of binder and nitrate ester plasticizer at a plasticizer to binder weight ratio of at least about 2.0:1, said binder being an elastomer formed from poly(caprolactone) and an isocyanate curative, the improvement comprising said poly(caprolactone) having a number average molecular weight of from about 4000 to about 20,000.

2. A high-energy composition according to claim 1 wherein said poly(caprolactone) has a functionality of from about 1 to about 6.

3. A high-energy composition according to claim 1 wherein said poly(caprolactone) has a functionality of from about 2 to about 4.

4. A high-energy composition according to claim 1 wherein said poly(caprolactone) has functionality of about 3.5 or greater and is cured with a diisocyanate curative.

5. A high-energy composition according to claim 4 wherein said diisocyanate curative is selected from the group consisting of isophorone diisocyanate and tolylene diisocyanate.

6. A high-energy composition according to claim 1 wherein the weight ratio of said plasticizer to said binder is at least about 2.5:1.

7. A solid propellant composition comprising between about 70 and about 85 weight percent particulate material including particulate fuel material and particulate oxidizer material, balance consisting essentially of binder and nitrate ester plasticizer at a plasticizer to binder weight ratio of at least about 2.0:1, said binder being an elastomer formed from poly(caprolactone) and an isocyanate curative, the improvement comprising said poly(caprolactone) having a number average molecular weight of from about 6000 to about 10,000.

8. A high-energy composition according to claim 7 wherein said poly(caprolactone) has a functionality of from about 1 to about 6.

9. A high-energy composition according to claim 7 wherein said poly(caprolactone) has a functionality of from about 2 to about 4.

10. A high-energy composition according to claim 7 wherein said poly(caprolactone) has functionality of about 3.5 or greater and is cured with a diisocyanate curative.

11. A high-energy composition according to claim 10 wherein said diisocyanate curative is selected from the group consisting of isophorone diisocyanate and tolylene diisocyanate.

12. A high-energy composition according to claim 7 wherein the weight ratio of said plasticizer to said binder is at least about 2.5:1.

* * * * *